United States Patent
Furman

(10) Patent No.: US 7,085,539 B2
(45) Date of Patent: Aug. 1, 2006

(54) COMMUNICATIONS CHANNEL CHARACTERIZATION DEVICE AND ASSOCIATED METHODS

(75) Inventor: William Nelson Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 250 days.

(21) Appl. No.: 10/768,247

(22) Filed: Jan. 30, 2004

(65) Prior Publication Data

US 2005/0170780 A1    Aug. 4, 2005

(51) Int. Cl.
*H04B 17/00* (2006.01)

(52) U.S. Cl. .............................. 455/67.13; 455/226.2; 455/424; 375/224

(58) Field of Classification Search ............. 455/67.11, 455/67.13, 67.14, 67.16, 424, 226.2; 375/224, 375/226–227
See application file for complete search history.

(56) References Cited

U.S. PATENT DOCUMENTS

| 6,088,383 | A | * | 7/2000 | Suzuki et al. | 375/148 |
| 6,654,429 | B1 | | 11/2003 | Li | 375/316 |
| 2004/0165687 | A1 | * | 8/2004 | Webster et al. | 375/350 |
| 2005/0037724 | A1 | * | 2/2005 | Walley et al. | 455/302 |

* cited by examiner

*Primary Examiner*—Lee Nguyen
(74) *Attorney, Agent, or Firm*—Allen, Dyer, Doppelt, Milbrath & Gilchrist, P.A.

(57) ABSTRACT

The system and method characterize a communications channel with respect to signal-to-noise ratio (SNR), time dispersion or multi-path, and frequency dispersion or Doppler spread. A probe signal demodulator receives a probe signal transmitted on a wireless communication channel and generates a demodulated probe signal, and a probe signal re-modulator generates a replica probe signal. A delay unit generates a delayed probe signal, and an adaptive canceller receives the delayed probe signal and the replica probe signal, and generates a residual noise signal and a channel characterization signal. A channel characterization block receives the channel characterization signal and the residual noise signal to generate channel measurements of the wireless communication channel.

25 Claims, 3 Drawing Sheets

COMMUNICATIONS CHANNEL CHARACTERIZATION DEVICE AND ASSOCIATED METHODS

FIELD OF THE INVENTION

The present invention relates to communication methods, systems and products in general, and more particularly, to methods and systems that monitor and select desired radio frequencies for communications.

BACKGROUND OF THE INVENTION

Wireless communication channels, that is, HF, VHF, UHF radio channels, are prone to limitations in received signal strength and the resulting signal-to-noise ratio (SNR) at the receiver. Additionally many wireless communications channels suffer from time dispersion or multi-path, which results when two or more instances of the transmitted signal arrive at the receiver with different time delay. A third common form of wireless signal degradation is frequency dispersion or Doppler spread. This fading phenomenon occurs due to variability in the received signal amplitude gain and phase.

SUMMARY OF THE INVENTION

It is an object of the present invention to provide a system and method for characterizing a communications channel with respect to signal-to-noise ratio (SNR), time dispersion or multi-path, and frequency dispersion or Doppler spread.

This and other objects, advantages and features in accordance with the present invention are provided by a communication channel measurement unit including a probe signal demodulator to receive a probe signal transmitted on a wireless communication channel and generate a demodulated probe signal, and a probe signal re-modulator to receive the demodulated probe signal and generate a replica probe signal. A delay unit receives the probe signal transmitted on the wireless communication channel and generates a delayed probe signal, and an adaptive canceller receives the delayed probe signal and the replica probe signal, and generates a residual noise signal and/or a channel characterization signal. Preferably, a channel characterization block receives the channel characterization signal and the residual noise signal to generate channel measurements of the wireless communication channel.

The channel characterization block preferably includes a first power measurement unit to receive the probe signal transmitted on the wireless communication channel and to generate a signal-and-noise power measurement signal, and a second power measurement unit to receive the residual noise signal and generate a residual noise power measurement signal. A signal-to-noise determination unit receives the signal-and-noise power measurement signal and the residual noise power measurement signal, and determines a signal-to-noise ratio of the wireless communication channel.

The channel characterization block may also or alternatively include a multipath estimation unit to receive the channel characterization signal and estimate the number of multipath propagation modes and a total time spread of the wireless communication channel, and/or a Doppler estimation unit to receive the channel characterization signal and estimate frequency dispersion on the wireless communication channel. The adaptive canceller may include a linear filter having adjustable taps and a subtracter associated with the linear filter.

Objects, advantages and features in accordance with the present invention are also provided by a method of characterizing a communication channel including receiving and demodulating a probe signal transmitted on a wireless communication channel to generate a demodulated probe signal, and re-modulating the demodulated probe signal to generate a replica probe signal. A residual noise signal and a channel characterization signal are generated based upon a delayed probe signal and the replica probe signal, and channel measurements of the wireless communication channel are generated based upon the channel characterization signal and the residual noise signal.

Generating channel measurements may include measuring a signal-and-noise power of the probe signal transmitted on the wireless communication channel, measuring a residual noise power of the residual noise signal, and determining a signal-to-noise ratio of the wireless communication channel based upon the measured signal-and-noise power and the measured residual noise power. Also, generating channel measurements may include estimating the number of multipath propagation modes and a total time spread of the wireless communication channel based upon the channel characterization signal, and/or estimating frequency dispersion on the wireless communication channel based upon the channel characterization signal.

This invention can be used to monitor and select desired radio frequencies for communications and/or adapt the on-air parameters of a communication system in such a way that the communications system tracks the natural variations of the channel. Although the following description and embodiments refer to the HF radio propagation band, this technique is equally applicable to all communication systems and radio frequency bands.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
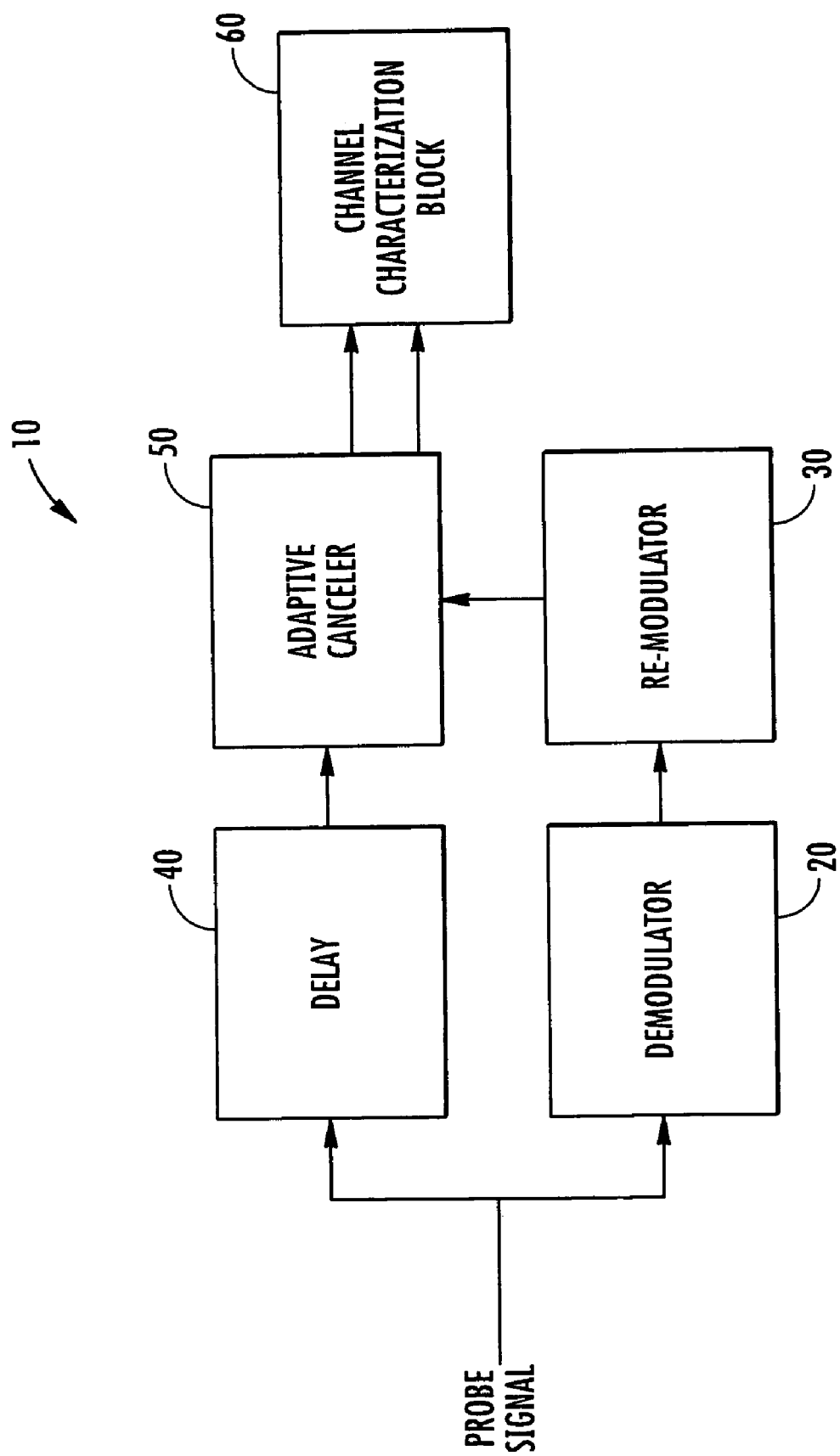
FIG. 1 is a schematic block diagram illustrating a channel characterization or measurement unit according to the present invention.
Figure 2:
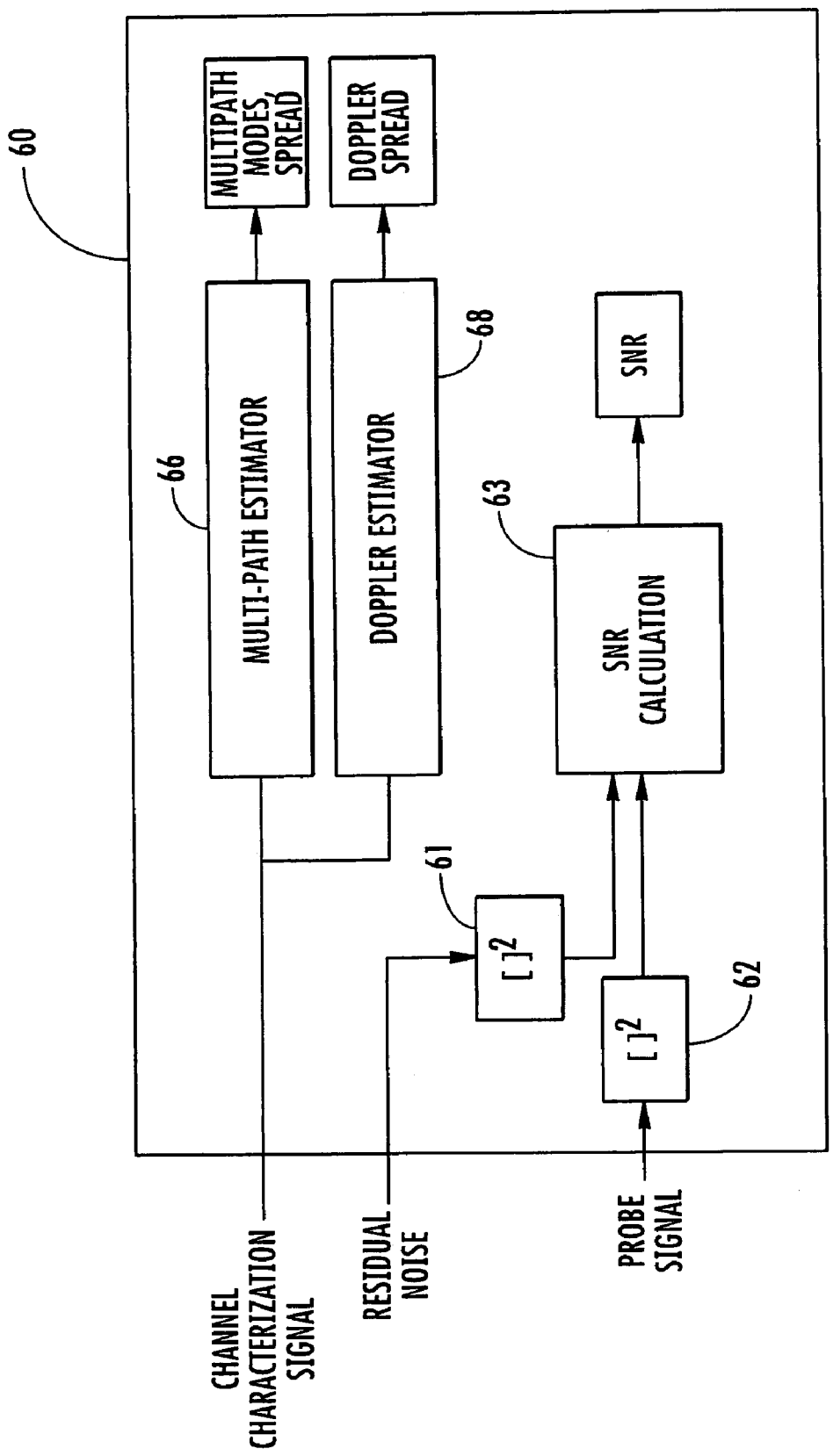
FIG. 2 is schematic block diagram illustrating further details of a channel characterization block according to the present invention of the channel characterization unit of FIG. 1.

Referring initially to FIGS. 1 and 2, a communication channel measurement unit 10 for characterizing a communications channel with respect to signal-to-noise ratio (SNR), time dispersion or multi-path, and frequency dispersion or Doppler spread, will be described. The communication channel measurement unit 10 includes a probe signal demodulator 20 to receive a probe signal or waveform transmitted on a wireless communication channel, e.g. on a HF band between 3 MHz and 30 MHz. For example, the probe signal preferably includes pseudo-randomly selected m-PSK signal constellation points providing appropriate auto-correlation characteristics. The probe signal may also convey system data or information. The demodulator 20 generates a demodulated probe signal fed to a probe signal re-modulator 30 which generates a replica, or clean version, of the probe signal that was originally transmitted.

A delay unit 40 also receives the probe signal transmitted on the wireless communication channel and generates a delayed probe signal to an echo canceller or adaptive canceller 50 which is also input with the replica probe signal from the re-modulator 30. The adaptive canceller generates a residual noise signal and/or a channel characterization signal to be used to measure or estimate various parameters of the communication channel. The measurements/estimates can be used to select desired radio frequencies for communications and/or adapt the on-air parameters of a communication system in such a way that the communications system tracks the natural variations of the channel.

The adaptive canceller 50 typically includes a linear filter and associated taps, and a subtracter as would be appreciated by those skilled in the art. The adaptive canceller adjusts it taps to model the cumulative effect of the communications channel and any filtering that may be in the signal path. If the canceller taps exactly match the cumulative channel taps then the transmitted waveform will be completely removed from the received waveform leaving only the channel noise.

Preferably, a channel characterization block 60 receives the channel characterization signal and the residual noise signal from the adaptive canceller 50 to generate the channel measurements of the wireless communication channel. As such, the channel characterization block 60 preferably includes a first power measurement unit 62 to receive the probe signal transmitted on the wireless communication channel and to generate a signal-and-noise power measurement signal, and a second power measurement unit 61 to receive the residual noise signal and generate a residual noise power measurement signal. A signal-to-noise determination unit 63 receives the signal-and-noise power measurement signal and the residual noise power measurement signal, and determines a signal-to-noise ratio of the wireless communication channel.

The channel characterization block 63 may also or alternatively include a multipath estimation unit 66 to receive the channel characterization signal and estimate the number of multipath propagation modes and a total time spread of the wireless communication channel. Also, a Doppler estimation unit 68 may be included to receive the channel characterization signal and estimate frequency dispersion on the wireless communication channel.

The adaptive canceller 50 taps are processed on a frame basis. One array is used to store the maximum canceller tap seen at each time delay for the duration of the reception. This is in effect a peak-hold of the channel impulse response. At the conclusion of signal reception this array is processed to yield an estimate of the number of propagation modes and the total time spread of the communications channel via the multipath estimation unit 66.

The adaptive canceller 50 taps are also processed on a frame basis to see how much variation there is from processing frame to processing frame. This is accomplished by taking a vector dot product of each of the frames taps with the previous frames taps, and the magnitude of the imaginary part of this result is used to estimate the amount of frequency dispersion or Doppler spread present on the communications channel via the Doppler estimation unit 68.

Figure 3:
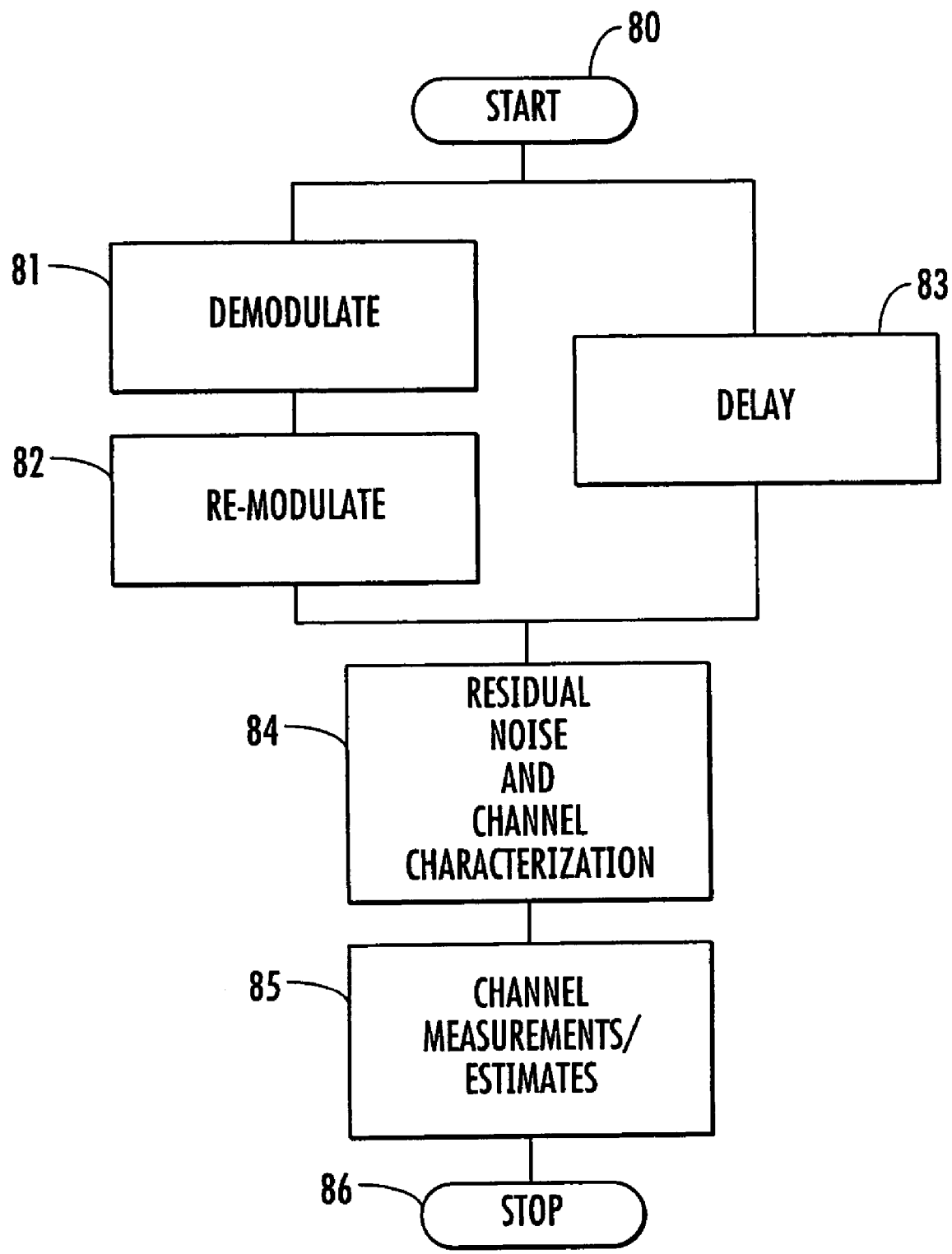
FIG. 3 is flowchart illustrating the method steps according to a method of characterizing a communications channel according to the present invention.

A method aspect of the present invention will now be described with reference to the flowchart in FIG. 3. The method of characterizing a communication channel begins (block 80) and includes receiving and demodulating a probe signal transmitted on a wireless communication channel to generate a demodulated probe signal (block 81). The demodulated probe signal is re-modulated at block 82 to generate a replica probe signal. Additionally, at block 83, a delayed probe signal is generated. At block 84, a residual noise signal and a channel characterization signal are generated based upon the delayed probe signal and the replica probe signal, before channel measurements of the wireless communication channel are generated at block 85, and the method ends (block 86). As discussed above, the measurements or estimates can be used to select desired radio frequencies for communications and/or adapt the on-air parameters of a communication system in such a way that the communications system tracks the natural variations of the channel.

In the method, generating channel measurements may include measuring a signal-and-noise power of the probe signal transmitted on the wireless communication channel, measuring a residual noise power of the residual noise signal, and determining a signal-to-noise ratio of the wireless communication channel based upon the measured signal-and-noise power and the measured residual noise power. Also, generating channel measurements may include estimating the number of multipath propagation modes and a total time spread of the wireless communication channel based upon the channel characterization signal, and/or estimating frequency dispersion on the wireless communication channel based upon the channel characterization signal, as discussed in detail above. Again, this technique is equally applicable to all communication systems and radio frequency bands.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communication channel measurement unit comprising:
   an input to receive a probe signal transmitted on a wireless communication channel;
   a probe signal demodulator connected to the input;
   a probe signal re-modulator connected downstream of the probe signal demodulator to generate a replica probe signal;
   a delay unit connected to the input to generate a delayed probe signal; and
   an adaptive canceller to generate a residual noise signal and a channel characterization signal based upon the delayed probe signal and the replica probe signal.

2. A communication channel characterization unit according to claim 1 further comprising:
   a first power measurement unit connected to the input to generate a signal-and-noise power measurement signal;
   a second power measurement unit to receive the residual noise signal and generate a residual noise power measurement signal; and a signal-to-noise determination unit to receive the signal-and-noise power measurement signal and the residual noise power measurement signal, and to determine a signal-to-noise ratio of the wireless communication channel.

3. A communication channel characterization unit according to claim 1 further comprising
a multipath estimation unit to receive the channel characterization signal and estimate the number of multipath propagation modes and a total time spread of the wireless communication channel.

4. A communication channel characterization unit according to claim 1 further comprising a Doppler estimation unit to receive the channel characterization signal and estimate frequency dispersion on the wireless communication channel.

5. A communication channel characterization unit according to claim 1 further comprising a channel characterization block to receive the channel characterization signal and the residual noise signal to generate channel measurements of the wireless communication channel.

6. A communication channel characterization unit according to claim 5 wherein the channel characterization block comprises:
a first power measurement unit connected to the input to generate a signal-and-noise power measurement signal;
a second power measurement unit to receive the residual noise signal and generate a residual noise power measurement signal;
a signal-to-noise determination unit to receive the signal-and-noise power measurement signal and the residual noise power measurement signal, and to determine a signal-to-noise ratio of the wireless communication channel;
a multipath estimation unit to receive the channel characterization signal and estimate the number of multipath propagation modes and a total time spread of the wireless communication channel; and
a Doppler estimation unit to receive the channel characterization signal and estimate frequency dispersion on the wireless communication channel.

7. A communication channel characterization unit according to claim 1 wherein the adaptive canceller comprises:
a linear filter having adjustable taps; and
a subtracter associated with the linear filter.

8. A communication channel characterization unit according to claim 1 wherein probe signal is received on a wireless communication channel in a High Frequency (HF) band between 3 MHz to 30 MHz.

9. A communication channel measurement unit comprising:
a probe signal demodulator to receive a probe signal transmitted on a wireless communication channel and generate a demodulated probe signal;
a probe signal re-modulator to receive the demodulated probe signal and generate a replica probe signal;
a delay unit to receive the probe signal transmitted on the wireless communication channel and generate a delayed probe signal;
an adaptive canceller to generate a residual noise signal and a channel characterization signal based upon the delayed probe signal and the replica probe signal; and
a channel characterization block to receive the channel characterization signal and the residual noise signal to generate channel measurements of the wireless communication channel.

10. A communication channel characterization unit according to claim 9 wherein the channel characterization block comprises:
a first power measurement unit to receive the probe signal transmitted on the wireless communication channel and to generate a signal-and-noise power measurement signal;
a second power measurement unit to receive the residual noise signal and generate a residual noise power measurement signal; and
a signal-to-noise determination unit to receive the signal-and-noise power measurement signal and the residual noise power measurement signal, and to determine a signal-to-noise ratio of the wireless communication channel.

11. A communication channel characterization unit according to claim 9 wherein the channel characterization block comprises a multipath estimation unit to receive the channel characterization signal and estimate the number of multipath propagation modes and a total time spread of the wireless communication channel.

12. A communication channel characterization unit according to claim 9 wherein the channel characterization block comprises a Doppler estimation unit to receive the channel characterization signal and estimate frequency dispersion on the wireless communication channel.

13. A communication channel characterization unit according to claim 9 wherein the channel characterization block further comprises:
a first power measurement unit connected to receive the probe signal transmitted on the wireless communication channel and to generate a signal-and-noise power measurement signal;
a second power measurement unit to receive the residual noise signal and generate a residual noise power measurement signal;
a signal-to-noise determination unit to receive the signal-and-noise power measurement signal and the residual noise power measurement signal, and to determine a signal-to-noise ratio of the wireless communication channel;
a multipath estimation unit to receive the channel characterization signal and estimate the number of multipath propagation modes and a total time spread of the wireless communication channel; and
a Doppler estimation unit to receive the channel characterization signal and estimate frequency dispersion on the wireless communication channel.

14. A communication channel characterization unit according to claim 9 wherein the adaptive canceller comprises:
a linear filter having adjustable taps; and
a subtracter associated with the linear filter.

15. A communication channel characterization unit according to claim 9 wherein probe signal is received on a wireless communication channel in a High Frequency (HF) band between 3 MHz to 30 MHz.

16. A communication channel measurement unit comprising:
a probe signal demodulator to receive a probe signal transmitted on a wireless communication channel and generate a demodulated probe signal;
a probe signal re-modulator to receive the demodulated probe signal and generate a replica probe signal;

a delay unit to receive the probe signal transmitted on the wireless communication channel and generate a delayed probe signal;

an adaptive canceller to generate a channel characterization signal based upon the delayed probe signal and the replica probe signal; and a channel characterization block to generate channel measurements of the wireless communication channel based upon the channel characterization signal.

17. A communication channel characterization unit according to claim 16 wherein the channel characterization block comprises a multipath estimation unit to receive the channel characterization signal and estimate the number of multipath propagation modes and a total time spread of the wireless communication channel.

18. A communication channel characterization unit according to claim 16 wherein the channel characterization block comprises a Doppler estimation unit to receive the channel characterization signal and estimate frequency dispersion on the wireless communication channel.

19. A communication channel measurement unit comprising:

a probe signal demodulator to receive a probe signal transmitted on a wireless communication channel and generate a demodulated probe signal;

a probe signal re-modulator to receive the demodulated probe signal and generate a replica probe signal;

a delay unit to receive the probe signal transmitted on the wireless communication channel and generate a delayed probe signal;

an adaptive canceller to generate a residual noise signal based upon the delayed probe signal and the replica probe signal; and a channel characterization block to generate channel measurements of the wireless communication channel based upon the residual noise signal.

20. A communication channel characterization unit according to claim 19 wherein the channel characterization block comprises:

a first power measurement unit to receive the probe signal transmitted on the wireless communication channel and to generate a signal-and-noise power measurement signal;

a second power measurement unit to receive the residual noise signal and generate a residual noise power measurement signal; and a signal-to-noise determination unit to receive the signal-and-noise power measurement signal and the residual noise power measurement signal, and to determine a signal-to-noise ratio of the wireless communication channel.

21. A method of characterizing a communication channel comprising:

receiving and demodulating a probe signal transmitted on a wireless communication channel to generate a demodulated probe signal;

re-modulating the demodulated probe signal to generate a replica probe signal;

generating a residual noise signal and a channel characterization signal based upon a delayed probe signal and the replica probe signal; and generating channel measurements of the wireless communication channel based upon the channel characterization signal and the residual noise signal.

22. A method according to claim 21 wherein generating channel measurements comprises:

measuring a signal-and-noise power of the probe signal transmitted on the wireless communication channel;

measuring a residual noise power of the residual noise signal; and determining a signal-to-noise ratio of the wireless communication channel based upon the measured signal-and-noise power and the measured residual noise power.

23. A method according to claim 21 wherein generating channel measurements comprises estimating the number of multipath propagation modes and a total time spread of the wireless communication channel based upon the channel characterization signal.

24. A method according to claim 21 wherein generating channel measurements comprises estimating frequency dispersion on the wireless communication channel based upon the channel characterization signal.

25. A method according to claim 21 wherein generating channel measurements comprises:

measuring a signal-and-noise power of the probe signal transmitted on the wireless communication channel;

measuring a residual noise power of the residual noise signal;

determining a signal-to-noise ratio of the wireless communication channel based upon the measured signal-and-noise power and the measured residual noise power;

estimating the number of multipath propagation modes and a total time spread of the wireless communication channel based upon the channel characterization signal; and estimating frequency dispersion on the wireless communication channel based upon the channel characterization signal.

* * * * *

UNITED STATES PATENT AND TRADEMARK OFFICE
CERTIFICATE OF CORRECTION

PATENT NO. : 7,085,539 B2
APPLICATION NO. : 10/768247
DATED : August 1, 2006
INVENTOR(S) : Furman It is certified that error appears in the above-identified patent and that said Letters Patent is hereby corrected as shown below:

Column 5, Line 47            Delete: "wherein probe"
                             Insert: -- wherein the probe --

Column 6, Line 57            Delete: "wherein probe"
                             Insert: -- wherein the probe --

Signed and Sealed this

Twenty-second Day of May, 2007

JON W. DUDAS
*Director of the United States Patent and Trademark Office*